(12) United States Patent
Cattani et al.

(10) Patent No.: US 9,291,091 B2
(45) Date of Patent: Mar. 22, 2016

(54) TURBOCHARGER OPERATION TO INCREASE BRAKE EFFECTIVENESS

(75) Inventors: Luis Carlos Cattani, Aurora, IL (US); John Zagone, Westmont, IL (US); Bashar Y. Melhem, Orland Park, IL (US); Paul Gottemoller, Palos Park, IL (US); Michael D. Bartkowicz, Oswego, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 6 days.

(21) Appl. No.: 14/240,621

(22) PCT Filed: Aug. 25, 2011

(86) PCT No.: PCT/US2011/049036
§ 371 (c)(1),
(2), (4) Date: Feb. 24, 2014

(87) PCT Pub. No.: WO2013/028190
PCT Pub. Date: Feb. 28, 2013

(65) Prior Publication Data
US 2014/0208743 A1 Jul. 31, 2014

(51) Int. Cl.
| | |
|---|---|
| *F02B 33/44* | (2006.01) |
| *F02B 47/08* | (2006.01) |
| *F02M 25/07* | (2006.01) |
| *F02B 33/40* | (2006.01) |
| *F02D 13/04* | (2006.01) |
| *F02D 23/00* | (2006.01) |
| *F02B 37/00* | (2006.01) |

(52) U.S. Cl.
CPC ............... *F02B 33/40* (2013.01); *F02D 13/04* (2013.01); *F02D 23/00* (2013.01); *F02B 37/00* (2013.01); *F02M 25/073* (2013.01); *F02M 25/0707* (2013.01); *Y02T 10/144* (2013.01)

(58) Field of Classification Search
CPC .......... F02M 25/0707; F02M 25/0726; F02M 25/074; F02M 25/0706; F02M 25/0704; F02M 25/0736; F02M 25/0737; F02M 25/0703; F02M 25/0724; F02M 25/0719; F02D 13/04; F02D 23/00; B60W 10/00
USPC ............... 60/605.2, 602; 123/568.11, 568.12; 701/108
See application file for complete search history.

(56) References Cited

U.S. PATENT DOCUMENTS

RE39,258 E * 9/2006 Cosma et al. ................. 123/321
7,231,998 B1 * 6/2007 Schechter ..................... 180/165
(Continued)

FOREIGN PATENT DOCUMENTS

EP 2634403 A1 * 9/2013 ............. F02D 23/00

*Primary Examiner* — Thai Ba Trieu
*Assistant Examiner* — Ngoc T Nguyen
(74) *Attorney, Agent, or Firm* — Jeffrey P. Calfa; Mark C. Bach

(57) ABSTRACT

In response to activation of a compression release brake when a motor vehicle having a turbocharged internal combustion engine is operating at some elevation above sea level and a turbocharger compressor is operating in a region of an operating map which is creating boost air in an engine intake manifold which would cause the compression release brake to decelerate the vehicle more slowly at that elevation than it would at sea level for the same operating conditions of the vehicle and engine other than altitude, the compression release brake decelerates the vehicle less slowly by causing an exhaust gas recirculation system to reduce at least one of a) mass of exhaust diverted to an intake system of the engine and b) cooling of the diverted exhaust.

4 Claims, 3 Drawing Sheets

(56) References Cited

U.S. PATENT DOCUMENTS

| | | |
|---|---|---|
| 7,770,565 B2 * | 8/2010 | Sujan et al. .............. 123/568.21 |
| 2011/0036088 A1 | 2/2011 | Zielke |
| 2011/0289914 A1 * | 12/2011 | Afjeh .............................. 60/602 |
| 2014/0214308 A1 * | 7/2014 | Mulloy et al. ................ 701/110 |
| 2014/0216398 A1 * | 8/2014 | Cattani et al. ................ 123/320 |

* cited by examiner

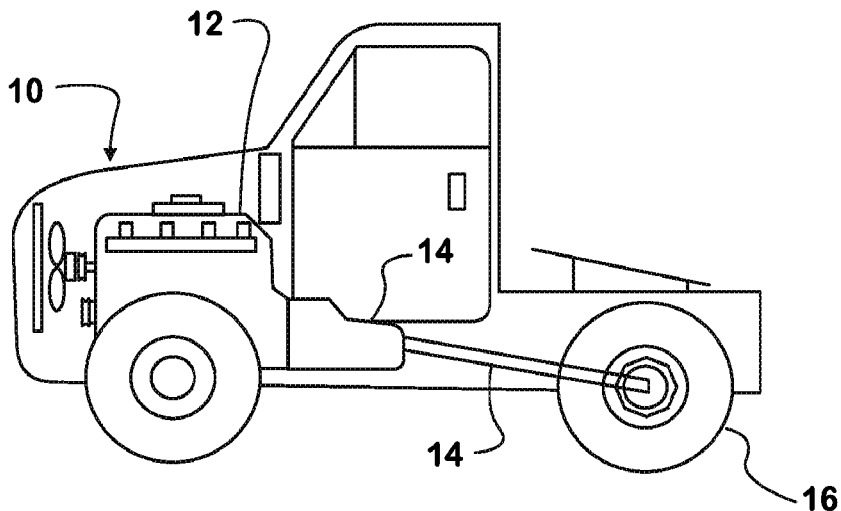
FIG. 1
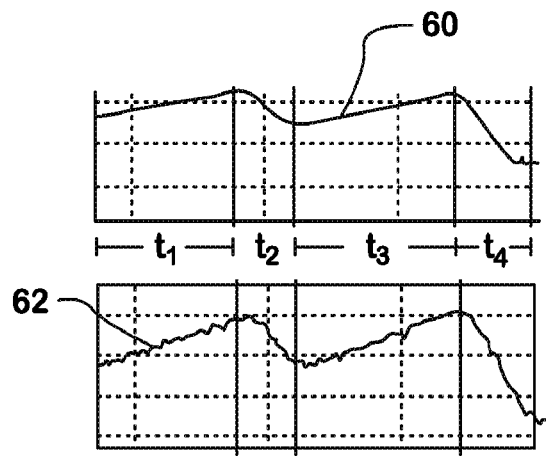
FIG. 3A
FIG. 3B
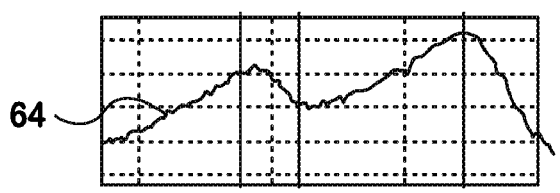
FIG. 3C
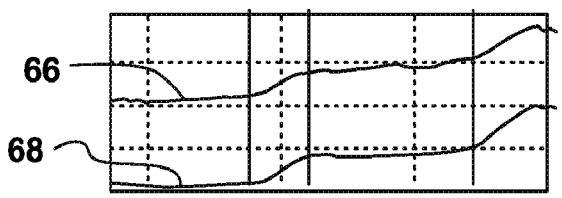
FIG. 3D

TURBOCHARGER OPERATION TO INCREASE BRAKE EFFECTIVENESS

TECHNICAL FIELD

This disclosure relates to a motor vehicle, such as a large truck vehicle, which is propelled by a turbocharged (either single- or multiple-stage) internal combustion propulsion engine having a compression release brake.

BACKGROUND

Some internal combustion propulsion engines, such as diesel engines which typically run unthrottled, have a compression release braking mechanism, sometimes simply called a compression release brake. A compression release brake functions to release air, or an air-exhaust mixture if exhaust gas is being recirculated to create the mixture, which reciprocating pistons have compressed within the engine cylinders during compression upstrokes of the pistons into an exhaust manifold of the engine so that energy used to compress the air or mixture is not recovered and used as a contribution to propulsion of the vehicle during ensuing downstrokes of the pistons.

When a motor vehicle is in motion after having been accelerated by its propulsion engine, and a driver of the vehicle ceases operating an accelerator control for the propulsion engine while road-engaging drive wheels of the vehicle continue to be coupled to the propulsion engine through a drivetrain, the propulsion engine begins to be driven by the road-engaging drive wheels through the drivetrain, rather than by combustion of fuel in the engine cylinders, and as a result, the load imposed on the drive wheels by the drivetrain and engine begins to decelerate the vehicle. If the engine has a compression release brake, the latter can be activated by the driver's operation of a compression release brake control to decelerate the vehicle more quickly than if the compression release brake is not activated. An example of such a control comprises an on-off switch for activating and de-activating the compression release brake and possibly a selector switch for selecting which engine cylinders will be used for engine braking. A control may also provide for engine braking to occur automatically upon the driver releasing the accelerator.

In an unthrottled turbocharged propulsion engine which has exhaust gas recirculation, the air/exhaust mixture from an intake manifold enters through an open cylinder intake valve or valves of a respective engine cylinder into the engine cylinder during an intake downstroke of a piston which reciprocates within the engine cylinder and is coupled by a connecting rod to a crankshaft of the engine. The mass flow into the respective engine cylinder is a function of pressure in the intake manifold which is created by a compressor (single- or multi-stage) of a turbocharger, i.e. is a function of boost created by a turbocharger compressor.

As the engine cycle for each engine cylinder transitions from an intake downstroke to a compression upstroke, the respective cylinder intake valve or valves operate from open to closed. Because one or more cylinder exhaust valves for each engine cylinder remain closed during the respective piston's compression upstroke, intake valve closing causes a volume of the air/exhaust mixture which has entered a respective engine cylinder during the piston downstroke to be trapped in the respective engine cylinder. As the respective piston upstrokes, it compresses the trapped volume. Kinetic energy of the moving vehicle provides the energy to compress the trapped volume, thereby contributing to vehicle deceleration.

In the absence of compression release braking, intake and exhaust valves for the respective engine cylinder would remain closed for substantially most of an ensuing downstroke of the respective piston after a compression upstroke, thereby allowing the energy of expansion of the trapped volume to force the respective piston downward and return energy through the drivetrain as a contribution to vehicle acceleration.

Activation of a compression release brake opens a respective engine cylinder to an exhaust manifold slightly in advance and/or during at least some portion of what would otherwise be an expansion power downstroke of the respective piston if combustion were occurring in the engine cylinder. Activation of the compression release brake causes energy imparted to the volume which was compressed during a compression upstroke to be dissipated to the exhaust manifold instead of being recovered and used to contribute to vehicle acceleration.

The purpose of activating a compression release engine brake is therefore to essentially eliminate contributions to vehicle acceleration which would otherwise occur during an expansion downstroke if the volume whose compression has contributed to vehicle deceleration during a compression upstroke were allowed to expand within the engine cylinder during the downstroke.

When travelling on roadways through mountainous regions, a vehicle may have no alternative but to operate at elevations significantly above sea level. The geography of such regions may compel roadway design to comprise significant grades along which a vehicle is likely to encounter both upgrades and downgrades. Equipping the propulsion engine of such a vehicle with a turbocharger enables the engine to develop increased torque and power useful for upgrade travel. Equipping the propulsion engine with a compression release brake enables the propulsion engine to decelerate the vehicle during downgrade travel either by itself or in conjunction with use of vehicle service brakes.

SUMMARY

It has been discovered that when a compression release brake of a turbocharged internal combustion engine which propels a motor vehicle is activated while the vehicle is operating at some elevation above sea level and the turbocharger compressor is operating in a region of an operating map which would cause the compression release brake to decelerate the vehicle more slowly at that elevation than it would at sea level for the same operating conditions of the vehicle and engine other than altitude, the compression release brake can decelerate the vehicle more quickly at the higher elevation by causing an exhaust recirculation system of the engine to reduce at least one of a) mass of diverted exhaust and b) cooling of diverted exhaust.

One general aspect of the claimed subject matter relates to the method defined by independent Claim 1.

Another general aspect of the claimed subject matter relates to the vehicle defined by independent Claim 3.

The foregoing summary is accompanied by further detail of the disclosure presented in the Detailed Description below with reference to the following drawings which are part of the disclosure.

BRIEF DESCRIPTION OF THE DRAWINGS

FIG. 1 schematically shows a truck vehicle having a turbocharged internal combustion propulsion engine which has a compression release brake.

FIGS. 3A, 3B, 3C, and 3D comprise a series of time-based graph plots of certain turbocharger and engine operating parameters during downgrade travel of a vehicle.

DETAILED DESCRIPTION

FIG. 1 shows a truck vehicle 10 which is propelled by a multi-cylinder internal combustion propulsion engine 12 operating to deliver torque through a drivetrain 14 to drive wheels 16.

Figure 2:
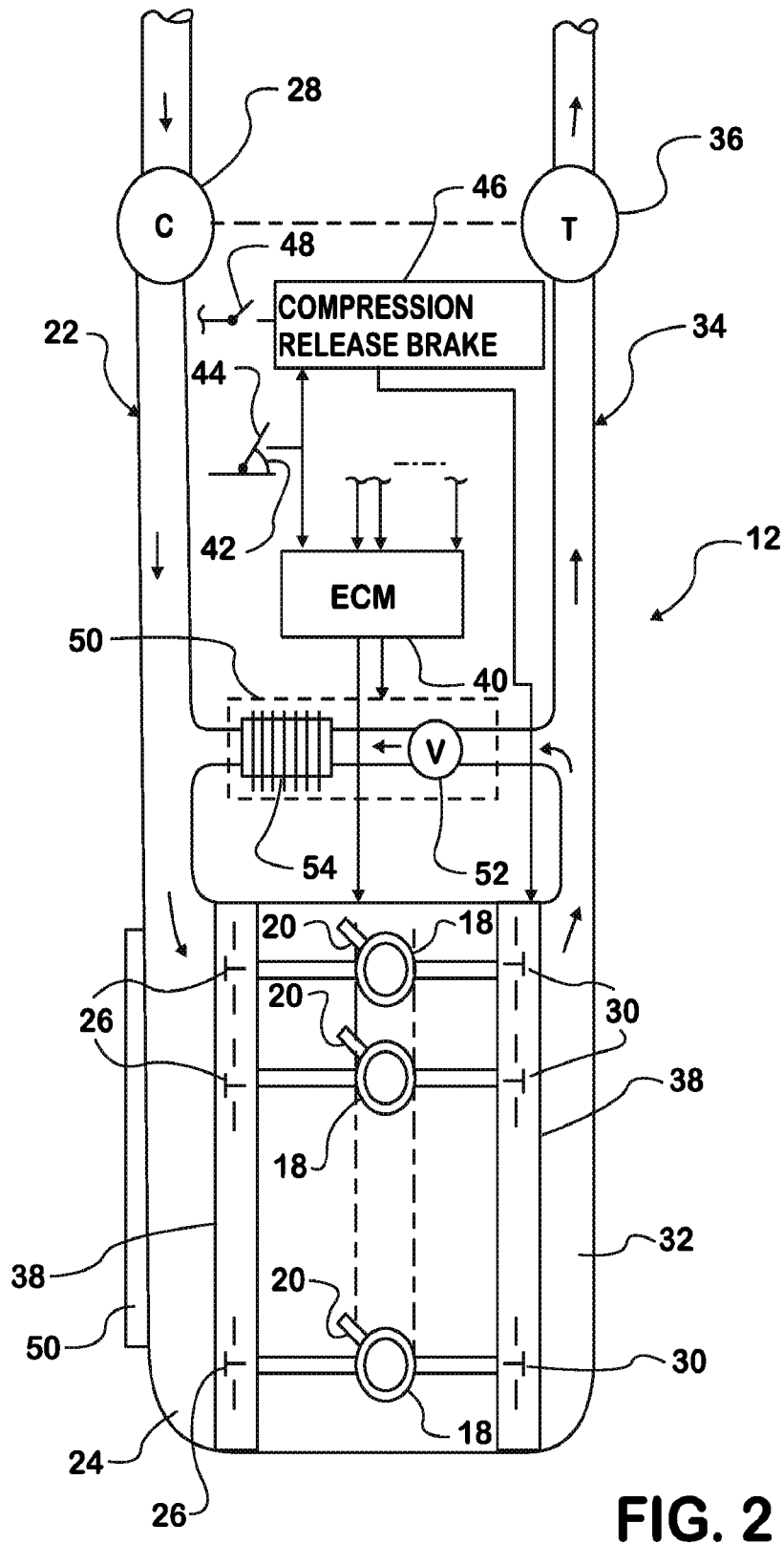
FIG. 2 is a general schematic diagram of the propulsion engine.

FIG. 2 shows multi-cylinder internal combustion propulsion engine 12 as a diesel engine which comprises structure forming a number of engine cylinders 18 into which fuel is injected by fuel injectors 20 to combust with air which has entered engine cylinders 18 through an intake system 22. Engine 12 comprises an intake manifold 24 through which air which has passed through intake system 22 enters engine cylinders 18 when cylinder intake valves 26 for controlling admission of air from intake manifold 24 into respective engine cylinders 18 are open.

Intake system 22 comprises a compressor 28 which may comprise either a single stage or multiple stages for elevating pressure in intake manifold 24 to superatmospheric pressure, meaning pressure greater than that of ambient air pressure, i.e. for creating boost air in intake manifold 24. Other components which may be present in intake systems of contemporary diesel engines are not shown.

Engine 12 further comprises cylinder exhaust valves 30 for controlling admission of exhaust from respective engine cylinders 18 into an exhaust manifold 32 for further conveyance through an exhaust system 34. Exhaust system 34 includes a turbine 36 which may comprise either a single stage or multiple stages each of which is coupled by a respective shaft to operate a respective stage of compressor 28. Other components which may be present in exhaust systems of contemporary diesel engines are not shown.

Collectively, compressor 28 and turbine 36 form a turbocharger which may be either a single- or a multiple-stage type.

Engine 12 comprises mechanisms 38 for controlling the timing of opening and/or closing of cylinder intake valves 26 and cylinder exhaust valves 30 respectively during engine cycles. The mechanisms may comprise one or more camshafts (depending on engine configuration) having cams shaped to provide fixed timing of operation of the cylinder valves. If an engine has variable valve actuation (VVA) for varying timing of opening and/or closing of cylinder valves, that capability may be provided by any of a variety of mechanisms.

A processor-based engine control module (ECM) 40 controls various aspects of engine operation, such as fueling of engine cylinders 18 by fuel injectors 20. Control is accomplished by processing various input data, including accelerator position data from an accelerator position sensor 42 operated by an accelerator 44, shown schematically as a foot pedal which is depressed by a driver of the vehicle to accelerate propulsion engine 12.

Engine 12 also has a compression release brake 46 which, when activated, interacts with cylinder exhaust valves 30 in a manner which causes them to open during portions of engine cycles which are significantly different from portions of engine cycles during which they would otherwise be open if truck vehicle 10 were being propelled by combustion in engine cylinders 18. Activation and de-activation of compression release brake 46 may be controlled in any of various ways.

One type of control comprises an on-off switch 48 which can be operated by a driver of the vehicle to activate and de-activate compression release brake 46. A control may also include a selector switch (not shown) for selecting which engine cylinders 18 will be used for engine braking. A control may also provide for engine braking to occur automatically upon the driver releasing accelerator 44.

Engine 12 further comprises an exhaust gas recirculation (EGR) system 50 for diverting some exhaust upstream of turbine 36 for entrainment with air from compressor 28 to create an air/exhaust mixture which enters intake manifold 24. EGR system 50 is under the control of ECM 40, and is shown by way of example as a high-pressure EGR system comprising an EGR valve 52 and an EGR cooler 54. ECM 40 controls EGR system 50 by controlling EGR valve 52 and/or EGR cooler 54.

When truck vehicle 10 is in motion, and its driver is operating accelerator 44, ECM 40 causes propulsion engine 12 to be fueled in accordance with a fueling strategy so that propulsion engine 12 delivers torque through drivetrain 14 to drive wheels 16 for propelling truck vehicle 10. When the driver ceases to operate accelerator 44 while drive wheels 16 continue to be coupled to propulsion engine 12 through drivetrain 14, propulsion engine 12 begins to be driven by drive wheels 16 through drivetrain 14, rather than by combustion of fuel in engine cylinders 18. Engine braking can then be initiated either automatically or by the driver operating switch 48 to ON position to activate compression release brake 46.

In response to activation of compression release brake 46 when truck vehicle 10 is operating at some elevation above sea level and compressor 28 is operating in a region of an operating map which is creating boost air in intake manifold 24 which would cause compression release brake 46 to decelerate truck vehicle 10 more slowly at that elevation than it would at sea level for the same operating conditions of the vehicle and propulsion engine other than altitude, EGR system 50 is controlled in a manner which causes compression release brake 46 to decelerate the vehicle less slowly by reducing the mass of exhaust allowed to pass through EGR valve 52 and/or reducing the amount of exhaust cooling performed by EGR cooler 54.

ECM 40 can contain an algorithm representing a strategy for determining if the mass of exhaust allowed to pass through EGR valve 52 should be reduced and/or if the amount of exhaust cooling performed by EGR cooler 54 should be reduced when use of compression release brake 46 is requested. In making the determination, the algorithm may process various data such as boost data, ambient atmospheric pressure data, and temperatures of exhaust entering EGR valve 52 and exhaust leaving EGR cooler 54.

FIGS. 3A, 3B, 3C, and 3D comprise contemporaneous traces showing certain operating parameters as a function of time during a downgrade test drive of a vehicle having a turbocharged propulsion engine. It is because of the discernment of relationships present in FIGS. 3A, 3B, 3C, and 3D, relationships which, it is believed, would be recondite to others, that the claimed subject matter has been developed.

FIG. 3A contains a trace 60 representing engine speed in non-dimensional units of measurement; FIG. 3B, a trace 62 representing speed of a high-pressure stage of a turbocharger compressor in non-dimensional units of measurement; FIG. 3C, a trace 64 representing speed of a low-pressure stage of the turbocharger compressor in non-dimensional units of measurement; and FIG. 3D, a trace 66 representing outlet pressure of the high-pressure stage of the turbocharger compressor in non-dimensional units of measurement and a trace 68 representing boost in an intake manifold of the propulsion engine in non-dimensional units of measurement.

During a span of time t1 which begins with the vehicle at a first altitude, traces 66 and 68 show that both outlet pressure of the high-pressure stage of the turbocharger compressor and boost remain largely unchanged even through traces 60, 62, and 64 show that engine and turbocharger speeds are increasing as the vehicle is descending toward a second altitude which is lower than the first. The outlet pressure of the high-pressure stage of the turbocharger compressor and boost are largely unchanged during this time because the turbocharger is causing the compressor to operate in a relatively less efficient region of an operating map.

During a span of time t2 which begins with the vehicle at the second altitude, traces 66 and 68 show that both engine speed and turbocharger speed have begun to decrease. However, both outlet pressure of the high-pressure stage of the turbocharger compressor and boost are beginning to increase. This is because the decreasing turbocharger speed is causing the compressor to operate in a relatively more efficient region of the operating map.

During a span of time t3 which begins with the vehicle having descended to a third altitude lower than the second altitude, traces 60, 62, and 64 show that engine speed and turbocharger speeds are once again increasing while traces 66 and 68 show that both outlet pressure of the high-pressure stage of the turbocharger compressor and boost are being maintained at levels as high as or slightly higher than levels during span of time t1.

When engine and turbocharger speeds again start to decrease at the beginning of a span of time t4 with the vehicle having descended to a fourth altitude lower than the third altitude, their continued decrease causes both outlet pressure of the high-pressure stage of the turbocharger compressor and boost to increase even more rapidly than they did during span of time t2.

Figure 4:
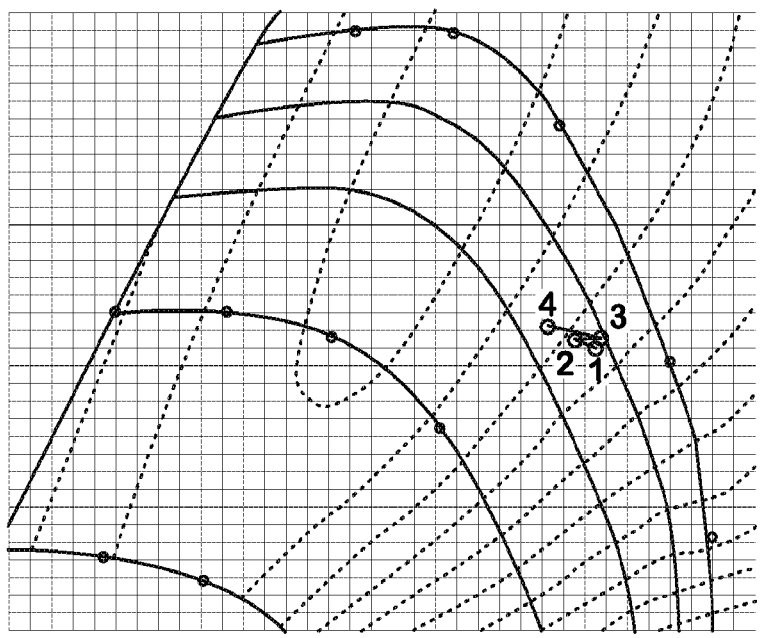
FIG. 4 is a compressor operating efficiency diagram for the turbocharger with data points correlated with FIG. 3.

Points 1, 2, 3, and 4 in FIG. 4 show an undimensioned map of compressor operating efficiency at the ends of spans of time t1, t2, t3, and t4 in FIGS. 3A, 3B, 3C, and 3D. It can be seen that between points 1 and 2 and between points 3 and 4, compressor operating efficiency has increased by movement toward islands of higher efficiency.

Because effectiveness of compression release brake 46 depends on boost, and because compression release brake 46 may be activated when compressor 28 is operating in a relatively less efficient region of an operating map, compression release brake 46 can become more effective sooner than it otherwise would a) by causing EGR cooler 54 to reduce its cooling of exhaust, thereby adding thermal energy to the air/exhaust mixture entering intake manifold 24, and/or b) by causing EGR valve 52 to impose greater restriction on exhaust flow, thereby reducing mass of the air/exhaust mixture. Overcoming slowness in improvement of compressor efficiency by performing one or both steps, enables the turbocharger to more rapidly increase compressor efficiency and hence more rapidly increase boost when compared to not performing either step. This improvement in engine braking is of significance to a vehicle when traveling downgrade at elevations significantly above sea level.

Figure 5:
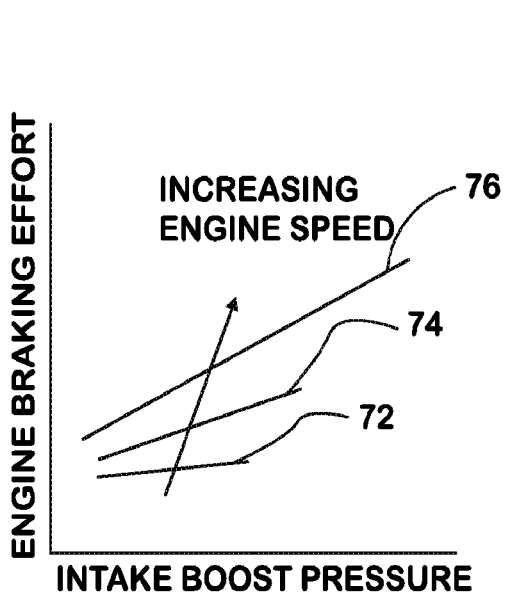
FIG. 5 is a diagram showing graph plots of engine braking effort as a function of boost.

FIG. 5 shows three representative plots 72, 74, 76 of engine braking effort as a function of boost at each of three successively higher engine speeds. They show that engine braking effort generally increases with increasing boost.

Figure 6:
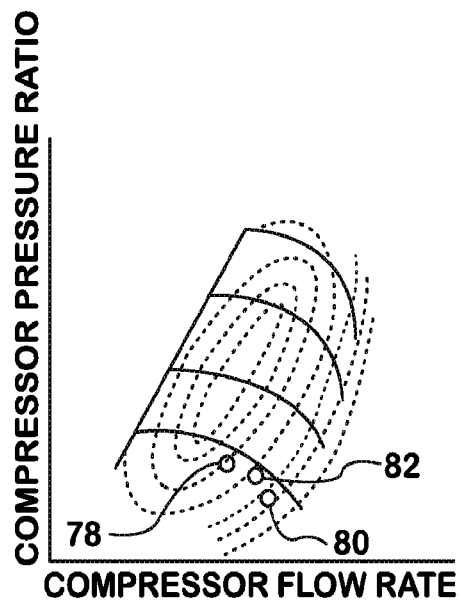
FIG. 6 is a compressor efficiency diagram.

FIG. 6 shows three points 78, 80, and 82 on a compressor efficiency map. Point 78 represents compressor efficiency when the vehicle is operating at low altitude, and point 80 represents compressor efficiency when the vehicle is operating at high altitude. The lower efficiency represented by point 80 in comparison to the higher efficiency represented by point 78 is due to the turbocharger's inherent limitations. By controlling EGR system 50 as described, compressor efficiency is improved to point 82, enabling compression release brake 46 to become more effective sooner than it might otherwise at higher altitude.

Depending on a particular engine and a particular control strategy, it may be possible to integrate the use of EGR control as described above, with use of a charge air cooler by-pass, as described in the commonly owned patent application of the inventors (Attorney Docket D7005) incorporated herein by reference, and/or use of an intake manifold heater, as described in the commonly owned patent application of the inventors (Attorney Docket D7004) incorporated herein by reference, to accomplish improved effectiveness of a compression relief brake at higher altitudes.

What is claimed is:

1. A method comprising:
   providing an internal combustion propulsion engine of a vehicle coupled to road-engaging drive wheels through a drivetrain;
     the internal combustion propulsion engine comprising a plurality of engine cylinders with reciprocating pistons, a plurality of intake valves and an exhaust passageways for delivering air into the cylinders, a plurality of exhaust valves and an exhaust passageways for discharging exhaust gas from the plurality of cylinders, an intake manifold;
   providing a turbocharger comprising a turbine in the exhaust passageway operated by exhaust gas from the exhaust manifold and a compressor in the intake passageway upstream of the intake manifold through which air passes prior to entering the plurality of cylinders;
   providing an exhaust gas recirculation valve and an exhaust gas recirculation passageway for diverting some exhaust gas from the exhaust passageways to the intake passageway to create an air-exhaust mixture, entering the intake manifold: and
   providing a controller operatively connected with the exhaust gas recirculation;
   providing a compression release brake that is activated by releasing air compressed in at least one of the plurality of cylinders into the exhaust passageway when the pistons are reciprocated by the drive wheels through the drive train rather than by in-cylinder combustion so that energy of the released air is not recovered as a contribution to propulsion of the vehicles;
   in response to activation of the compression release brake when the vehicle is operating at an elevation above sea level and the compressor is operating in a region of an operating map that causes the compression release brake to decelerate the vehicle more slowly at said elevation than if at sea level for otherwise the same operating conditions, controlling the compression release brake to decelerate the vehicle less slowly by controlling the exhaust gas recirculation valve to reduce at least one of an amount of exhaust gas being diverted from the exhaust passageway to the intake passageway and the diverted exhaust gas being cooled by an exhaust gas recirculation cooler.

2. The method set forth in claim 1, further comprising, in response to activation of the compression release brake when the vehicle is operating at an elevation above sea level and the compressor is operating in a region of an operating map that causes the compression release brake to decelerate the vehicle more slowly at said elevation than at sea level for otherwise the same operating conditions, controlling the exhaust gas recirculation valve to reduce both an amount of exhaust gas being diverted from the exhaust passageway to the intake passageway and the diverted exhaust gas being cooled by the exhaust gas recirculation cooler.

3. A motor vehicle comprising:
- an internal combustion propulsion engine coupled to road-engaging drive wheels through a drivetrain for propelling the motor vehicle;
  - the internal combustion propulsion engine comprising engine cylinders with reciprocating cylinders, an intake passageway, an exhaust passageway, an intake manifold , and an exhaust manifold;
- a turbocharger comprising a turbine in the exhaust passageway operated by exhaust gas from the exhaust manifold and a compressor in the intake passageway;
- an exhaust gas recirculation valve and an exhaust gas recirculation passageway for diverting some exhaust gas from the exhaust passageway to the intake passageway to create an air-exhaust mixture entering the intake manifold and for controlling at least one of an amount of exhaust gas being diverted from the exhaust passageway to the intake passageway exhaust and the diverted exhaust gas being cooled by an exhaust gas recirculation cooler:
- a compression release brake activated by releasing air compressed in at least one of the plurality of cylinders into the exhaust passageway when the pistons are reciprocated by the drive wheels through the drive train rather than by in-cylinder combustion so that energy of the released air is not recovered as a contribution to propulsion of the vehicle; and
- a control module operatively coupled to the compression release brake and exhaust gas recirculation valve wherein, in response to activation of the compression release brake when the vehicle is operating at an elevation above sea level and the compressor is operating in a region of an operating map that causes the compression release brake to decelerate the vehicle more slowly at elevation than at sea level for otherwise the same operating conditions, the control module is programmed to control the compression release brake to decelerate the vehicle less slowly by controlling the exhaust gas recirculation valve to reduce at least one of an amount of exhaust gas being diverted from the exhaust passageway to the intake passageway and the diverted exhaust gas being cooled by the exhaust gas recirculation cooler.

4. The motor vehicle set forth in claim 3 wherein the control module is further programmed to, in response to activation of the compression release brake when the vehicle is operating at an elevation above sea level and the compressor is operating in a region of an operating that causes the compression release brake to decelerate the vehicle more slowly at said elevation than at sea level for otherwise the same operating conditions, controls the compression release brake to decelerate the vehicle less slowly by controlling the exhaust gas recirculation valve to reduce both an amount of exhaust gas bring diverted from the exhaust passageway to the intake passageway and the diverted exhaust gas being cooled by the exhaust gas recirculation cooler.

* * * * *